United States Patent
Worrell et al.

(10) Patent No.: US 9,147,430 B2
(45) Date of Patent: Sep. 29, 2015

(54) READING DATA FROM HARD DISKS HAVING REDUCED PREAMBLES

(71) Applicant: LSI Corporation, San Jose, CA (US)

(72) Inventors: Kurt J. Worrell, Longmont, CO (US); Jason D. Byrne, Longmont, CO (US); Scott M. Dziak, Longmont, CO (US)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 28 days.

(21) Appl. No.: 14/220,211

(22) Filed: Mar. 20, 2014

(65) Prior Publication Data

US 2015/0243321 A1 Aug. 27, 2015

Related U.S. Application Data

(60) Provisional application No. 61/944,208, filed on Feb. 25, 2014.

(51) Int. Cl.
*G11B 5/09* (2006.01)
*G11B 20/10* (2006.01)
*G11B 20/12* (2006.01)

(52) U.S. Cl.
CPC ........ *G11B 20/1024* (2013.01); *G11B 20/1217* (2013.01); *G11B 2020/1242* (2013.01)

(58) Field of Classification Search
None
See application file for complete search history.

(56) References Cited

U.S. PATENT DOCUMENTS

| | | | | |
|---|---|---|---|---|
| 5,231,545 A * | 7/1993 | Gold | | 360/49 |
| 5,475,540 A * | 12/1995 | Gold | | 360/48 |
| 5,517,631 A * | 5/1996 | Machado et al. | | 711/111 |
| 5,940,233 A * | 8/1999 | Malone, Sr. | | 360/51 |
| 6,181,497 B1 * | 1/2001 | Malone, Sr. | | 360/48 |
| 9,026,891 B2 * | 5/2015 | Dziak et al. | | 714/770 |
| 2014/0281061 A1 * | 9/2014 | Shaver et al. | | 710/58 |

* cited by examiner

*Primary Examiner* — Tan Dinh
(74) *Attorney, Agent, or Firm* — Hamilton DeSanctis & Cha

(57) ABSTRACT

An exemplary hard disk (HD) track has a full overhead section followed by user sections interleaved with intervening partial overhead sections that are too short for an HD drive (HDD) to attain sufficient timing lock using only one partial overhead section, but long enough for the drive to attain sufficient timing lock using multiple partial overhead sections to read user data from the user section immediately following the partial overhead section where sufficient timing lock is attained. The drive begins, but does not finish, attaining timing lock based on the first partial overhead section, but the drive does finish attaining timing lock based on the last partial overhead section. The drive can also read user data in subsequent user sections by maintaining or re-attaining sufficient timing lock using each successive partial overhead section. Increased user data storage is achieved without significantly impacting average latency of HDD read sessions compared to conventional HD drives.

20 Claims, 5 Drawing Sheets

READING DATA FROM HARD DISKS HAVING REDUCED PREAMBLES

CROSS-REFERENCE TO RELATED APPLICATIONS

This application claims the benefit of the filing date of U.S. provisional application No. 61/944,208, filed on Feb. 25, 2014, the teachings of which are incorporated herein by reference in their entirety.

BACKGROUND

1. Field of the Invention

The present invention relates to hard disk drives and, more specifically but not exclusively, to hard disk drives that read data from hard disks that are segmented into alternating user sections and overhead sections.

2. Description of the Related Art

This section introduces aspects that may help facilitate a better understanding of the invention. Accordingly, the statements of this section are to be read in this light and are not to be understood as admissions about what is prior art or what is not prior art.

Conventional hard disks (HDs) for HD drives (HDDs) have a plurality of concentric tracks, each of which is segmented into alternating user sections for storing user data and overhead sections for storing overhead data that is used by HD drives to attain timing lock needed to read user data stored in the user sections. Traditional hard disks are formatted according to a segmentation scheme that interleaves user sections will full overhead sections that enable an HD drive to attain sufficient timing lock using any single, full overhead section such that the HD drive is then able to read user data stored in the user section immediately following that overhead section. Such traditional hard disks enable each user section to be read independent of every other user section on the hard disk such that user data can be stored in increments as small as a single user section.

FIG. 1 shows a representation of a single, exemplary (simplified) HD track 100 having 12 user sections 120(1)-120(12) interleaved with 12 intervening, full overhead sections 110(1)-110(12), where each full overhead section 110(i) includes:

A pad field 112 that functions as a Viterbi closure field;
A write splice (WS) field 114 that functions as a preamplifier closure field for write sessions;
A complete preamble timing recovery field (PTRF) 116 containing a known data pattern (e.g., a 2T pattern) that enables an HD drive to attain sufficient timing lock to read user data in the immediately following user section along the track; and
A sync mark (SM) field 118 containing a known data pattern that separates the end of the preamble and the beginning of the immediately following user section to enable the HD drive to locate bit 0 of the user data stored in that user section.

The WS field covers the preamp closure (from the prior-written user data section and pad field) as well as the preamp opening (startup of the preamp for writing the following preamble and SM fields and user data section). Note that, in some cases, the WS field can also include so-called servo data that is completely unrelated to the read machine and is used by a separate machine for figuring out the track number and position along a track. In those cases, under normal operation, the WS field is skipped by both the read and write machines. Although exemplary track 100 of FIG. 1 is divided into 12 user sections 120 and 12 intervening overhead sections 110, tracks of typical hard disks are divided into many more user sections and intervening overhead sections.

To read data from any user section 120(i) of track 100, an HD drive attains sufficient timing lock using the complete preamble 116 of the immediately preceding overhead section 110(i). Since each preamble 116 in each overhead section 110 of track 100 is a complete preamble, an HD drive can begin reading data from track 100 as soon as the next overhead section 110 is encountered. For the segmentation scheme of track 100 having 12 equal-sized user sections 120 interleaved with 12 equal-sized overhead sections 110, an HD drive, whose read head has a random position over track 100 when an HDD read session is initially requested, will have to wait, on average, about 1/24 of a rotation of track 100 to begin to read user data from the next encountered user section.

In general, it is desirable (i) to store as much user data as possible on a hard disk and (ii) to read stored user data as quickly as possible.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

In some HD drives, user data is written into multiple, consecutive user sections along an HD track in a single HDD write session. Such user data and the intervening overhead data is referred to as coherent data because the phase of such user and overhead data is substantially uniform, or at least smoothly varying, over all of the user and overhead sections written during that single HDD write session.

U.S. patent application Ser. No. 13/831,246 (the '246 application), the teachings of which are incorporated herein by reference in their entirety, describes technology that exploits the phase uniformity/continuity of coherent data stored into an HD track during a single HDD write session. According to the '246 application, an HD track is segmented into user sections and intervening overhead sections, where at least one overhead section is a (conventional) full overhead section having a complete preamble field, and each full overhead section is followed by two or more user sections interleaved with one or more intervening, partial overhead sections having reduced preamble fields that are shorter than the complete preamble fields of a full overhead section, where a reduced preamble field is not long enough for an HD drive independently to acquire sufficient timing lock to read the user data stored in the immediately following user section.

Figure 1:
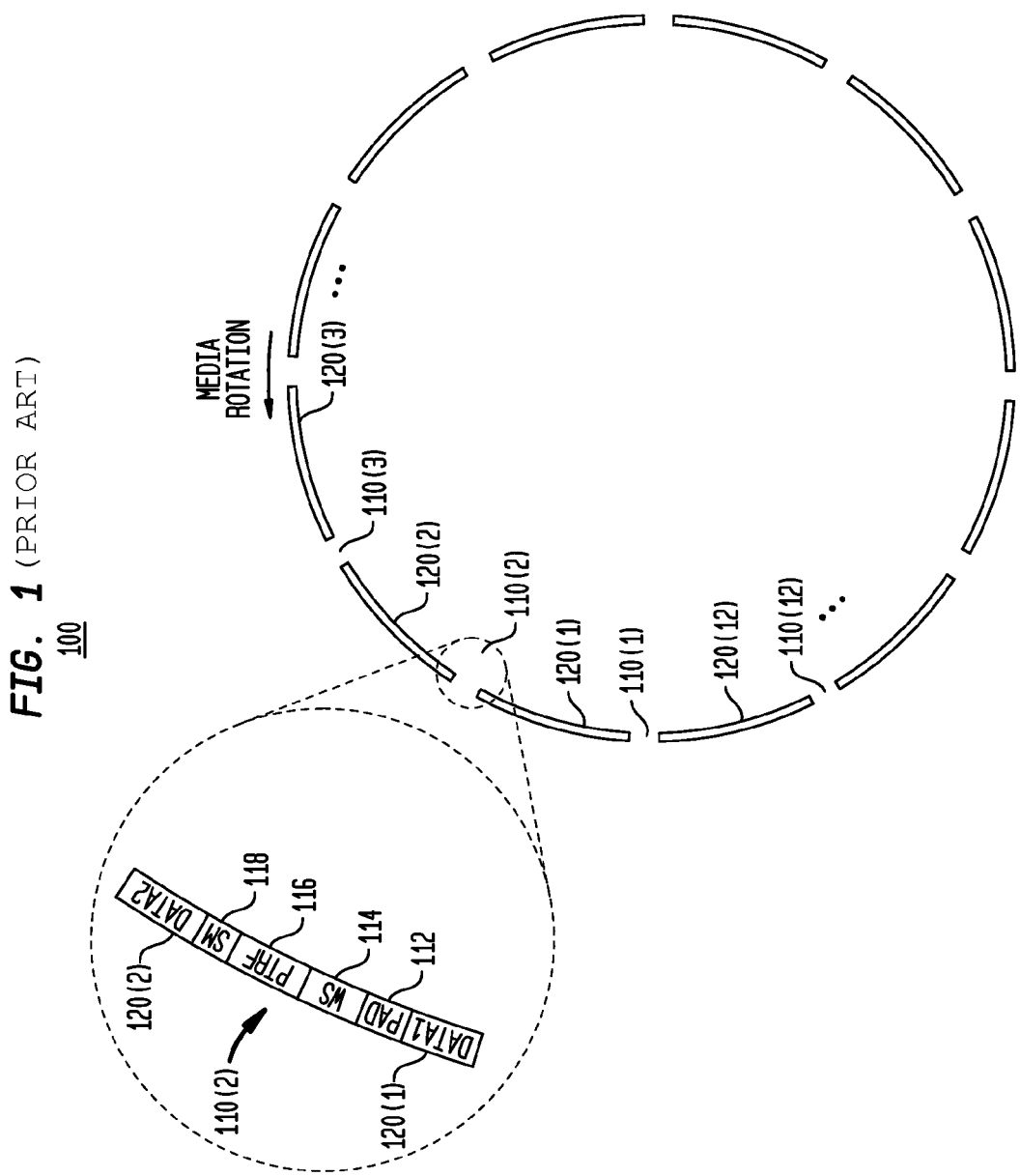
FIG. 1 shows a representation of a single, exemplary (simplified) HD track.
Figure 2:
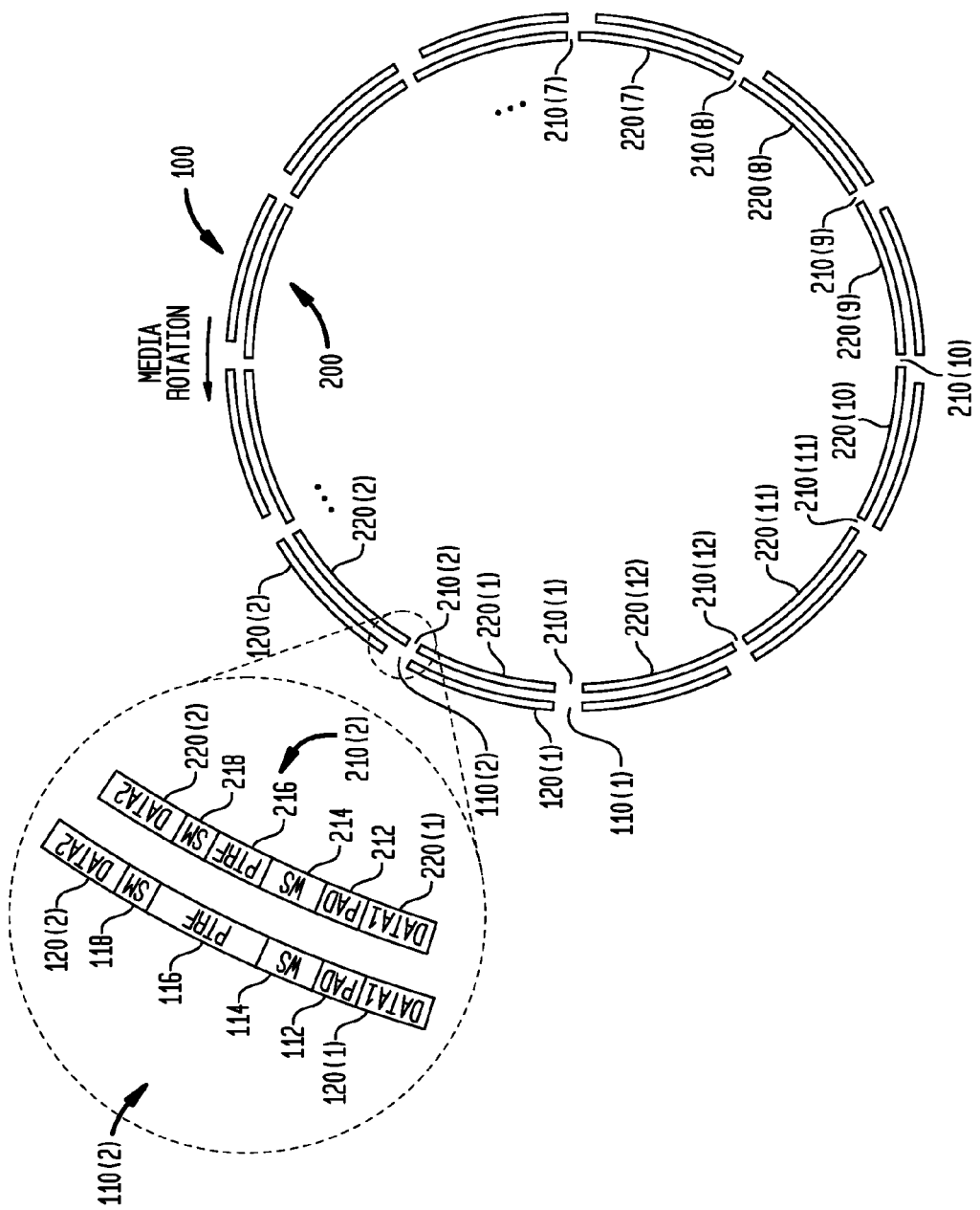
FIG. 2 shows a representation of two exemplary (simplified) HD tracks.

FIG. 2 shows a representation of two exemplary (simplified) HD tracks: track 100 and track 200. HD track 100 is identical to HD track 100 of FIG. 1 and therefore has 12 user sections 120(1)-120(12) interleaved with 12 intervening, full overhead sections 110(1)-110(12), each full overhead section 110(i) having a pad field 112, a WS field 114, a complete preamble field 116, and an SM field 118. HD track 200 also has 12 user sections 220(1)-220(12) interleaved with 12 intervening overhead sections 210(1)-210(12), but, in this case, the 12 overhead sections 210(i) comprise (i) one full overhead section 210(1) equivalent to the full overhead sections 110(i) of HD track 100 and (ii) eleven partial overhead sections 210(2)-210(12), each partial overhead section having a pad field 212, a WS field 214, a reduced preamble field 216, and an SM field 218, where fields 212, 214, and 218 of HD track 200 may be identical to fields 112, 114, and 118 of track 100.

Note that FIG. 2 is not intended to represent two tracks of an actual hard disk. Rather, FIG. 2 is intended to demonstrate the relative differences between a conventional HD track 100 and an HD track 200 of the '246 application. In a typical implementation, a hard disk of the '246 application would have all of its tracks analogous to HD track 200, albeit taking into account their different diameters as known in HD technology.

Note that each reduced preamble field 216 in an partial overhead section 210(i), i=2, . . . , 12, of HD track 200 has a shorter length than the complete preamble field 116 of full overhead section 210(1) of HD track 200. This means that each of the eleven partial overhead sections 210(2)-210(12) has a shorter length than the full overhead section 210(1). This, in turn, means that the 12 user sections 220 of track 200 have a longer total length than the 12 user sections 120 of track 100. As a result, more user data can be stored into track 200 than into track 100.

According to the '246 application, coherent overhead and user data can be written in a single HDD write session into HD track 200, starting at full overhead section 210(1) and continuing around track 200 as needed, up to and including storing overhead data in overhead section 210(12) and the last of the user data in user section 220(12). According to the '246 application, to read the resulting, coherent user data stored in HD track 200, an HD drive starts an HDD read session at full overhead section 210(1) and attains sufficient timing lock using that full overhead section, which enables the HD drive to read the user data stored in the immediately following user section 220(1).

Since the respective overhead and user data stored in the next, partial overhead section 210(2) and the immediately following user section 220(2) were written during the same HDD write session as the corresponding data in overhead and user sections 210(1) and 220(1), even though the next overhead section 210(2) has a reduced preamble field 216, the reduced preamble field 216 is still of sufficient length for the HD drive to maintain and/or re-attain the sufficient timing lock that the HD drive had attained using the initial, full overhead section 210(1). As such, the HD drive can then read user data from the next user section 220(2). The same is also true for one or more other subsequent partial overhead sections 210(3) et seq. and user sections 220(3) et seq. that were written into during that same single HDD write session.

Although hard disks formatted using the segmentation scheme of the '246 application can store more user data than hard disks formatted using the traditional segmentation scheme of FIG. 1, the average latency of starting an HDD read session according to the '246 application is significantly longer than that of traditional HD drives. As described earlier, the average latency for HD track 100 of FIG. 1 is about $\frac{1}{24}$ of an HD revolution, and the average time that it takes to complete an HDD read session of a full track (from the time that it is first requested) is about $1\frac{1}{24}$ HD revolutions. For typical hard disks having many more than 12 user sections and 12 intervening overhead sections, the average latency is shorter than $\frac{1}{24}$ HD revolution, and the average time-to-complete is closer to 1 HD revolution.

In order to read data from a hard disk formatted using the segmentation scheme of the '246 application represented by track 200 of FIG. 2, an HD drive must first find the full overhead section 210(1) in order to attain sufficient timing lock to read user data stored in the subsequent user section 220(1) et seq. Assuming that the HD read head is at a random orientation when an HDD read session is requested, HDD read sessions according to the '246 application have an average latency of about $\frac{1}{2}$ of an HD rotation before user data can begin to be read from the hard disk. Furthermore, the average time that it takes to complete an HDD read session of a full track according to the '246 application is about $1\frac{1}{2}$ HD revolutions. This latency and this time-to-complete apply no matter how many user and overhead sections there are in a track. The present disclosure is directed to a technique that can significantly reduce that average latency and average time-to-complete.

According to certain embodiments of the present disclosure, for a set of coherent data written during a single HDD write session into an HD track, such as track 200 of FIG. 2, an HD drive is able to begin (but not complete) the processing to attain timing lock using a partial overhead section and complete the attainment of that timing lock during a subsequent partial overhead section. In other words, the HD drive is able to attain sufficient timing lock using two or more consecutive partial overhead sections, without needing a full overhead section. The user data in the user section immediately following the last of those two or more partial overhead sections can then be read as can coherent user data in subsequent user sections using the intervening partial overhead sections to maintain or re-attain the timing lock from the previous partial overhead section.

Figure 3:
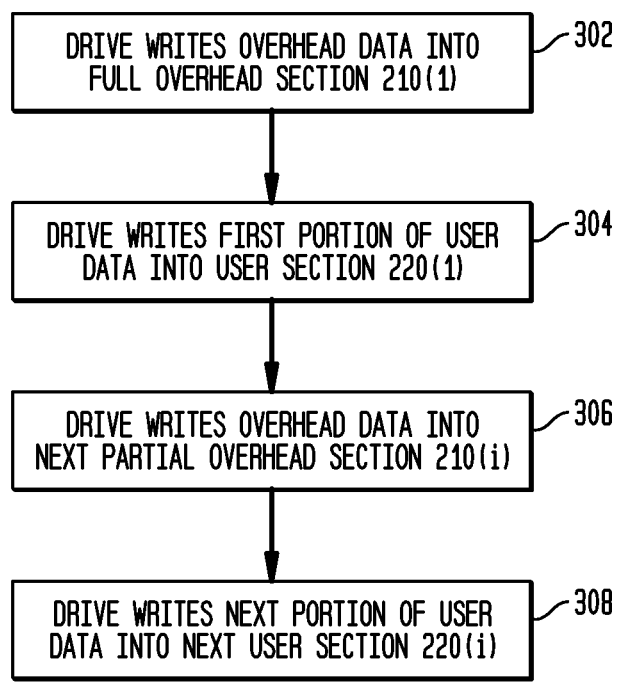
FIG. 3 shows a flow diagram of the processing for an exemplary HDD write session performed by an HD drive according to one embodiment of the present disclosure in the context of HD track 200 of FIG. 2.

FIG. 3 shows a flow diagram of the processing for an exemplary HDD write session performed by an HD drive according to one embodiment of the present disclosure in the context of HD track 200 of FIG. 2. Note that the processing for HDD write sessions is identical to the processing for HDD write sessions of the '246 application.

In step 302, the HDD write session begins with the writing of overhead data into full overhead section 210(1) including the writing of a complete preamble into preamble field 116. In step 304, the first portion of user data is written into user section 220(1). In step 306, overhead data is written into the next overhead section (i.e., partial overhead section 210(2)) including the writing of a reduced preamble into preamble field 216. In step 308, the next portion of user data is written into the next user section (i.e., 220(2)). Steps 306 and 308 are repeated for each successive partial overhead section 210(i) and user section 220(i), until overhead data is written into partial overhead section 210(12) and the last portion of user data is written into user section 220(12). Since all of the overhead and user data was written in a single HDD write session, all of that data is coherent data. Note that, in this exemplary scenario, user data is written into all 12 user sections 220. In other possible scenarios, user data is written into fewer than all 12 user sections 220, but, in any case, user data is written starting at user section 220(1) and continuing around the track until all of the user data has been written.

Figure 4:
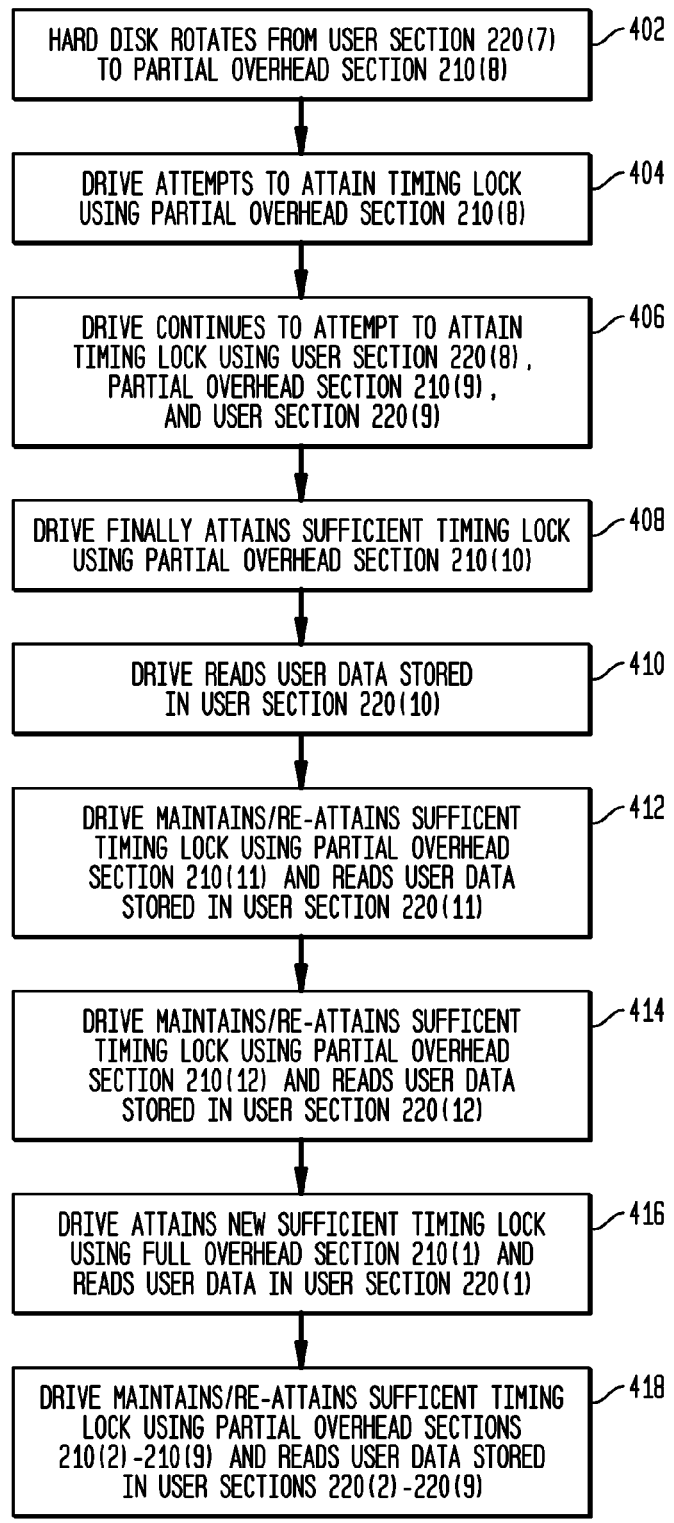
FIG. 4 shows a flow diagram of the processing for an exemplary HDD read session performed by an HD drive to read the user data written into HD track 200 of FIG. 2 during the HDD write session of FIG. 3, according to one embodiment of the present disclosure.

FIG. 4 shows a flow diagram of the processing for an exemplary HDD read session performed by an HD drive to read the user data written into HD track 200 of FIG. 2 during the HDD write session of FIG. 3, according to one embodiment of the present disclosure. The HDD read session begins at step 402 with the HDD read head positioned over some random location on HD track 200. In the exemplary scenario of FIG. 4, the HDD read head is initially positioned somewhere over user section 220(7). During step 402, the hard disk rotates until the HDD read head reaches partial overhead section 210(8). At step 404, the HD drive begins to attempt to attain timing lock using the reduced preamble field 216 of partial overhead section 210(8). Because the reduced preamble field 216 is too short for HD drive to attain sufficient timing lock, the HD drive is not able to read the user data in user section 220(8). However, during step 406, the HD drive uses that user data in user section 220(8) to continue to attempt to attain sufficient timing lock. This attempt to attain sufficient timing lock continues, without success but with improvement, during step 406 using partial overhead section 210(9) and user section 220(9). Note that, during step 406, the HD drive may perform a "speculative read" operation on user section 220(9), during which the HD drive attempts to read the user data even though sufficient timing lock has not been attained. At best, the HD drive will successfully read the user data; at worst, it will fail, but will be no worse off for having at least attempt the read operation.

During step 408, the HD drive finally attains sufficient timing lock using partial overhead section 210(10), such that, during step 410, the HD drive can read the user data stored in user section 220(10). This is an example of a "normal read" operation, because the HD drive is expected to be able to read user data from this user section. As in the '246 application, after attaining sufficient timing lock, the HD drive is able to maintain and/or re-attain sufficient timing lock during step 412 using partial overhead section 210(11) to enable the HD drive to read the user data stored in user section 220(11). The same is true for partial overhead section 210(12) and for user section 220(12) in step 414.

At step 416, the HDD read head has reached full overhead section 210(1) whose overhead data will typically not be in phase with the user data in user section 220(12). However, since full overhead section 210(1) has a complete preamble field 116, the HD drive is able to attain (a new) sufficient timing lock during step 416 using full overhead section 210(1), thereby enabling the HD drive to read the user data in user section 220(1). From there, the HD drive is able to maintain or re-attain sufficient timing lock using the subsequent partial overhead sections 210(2)-210(9) to read the user data stored in user sections 220(2)-220(9) to complete the reading of the user data from HD track 200 in step 418. Note that the HDD read head has to pass over and process partial overhead sections 210(8) and 210(9) and user sections 220(8) and 220(9) twice—once at the beginning of the read session and again at the end of the read session—complete the read session.

Note that, in this exemplary scenario, the user data is read out of order. In particular, the 10th through 12th portions are user data are read out before the 1st through 9th portions. To reconstruct the data in its proper order, the HD drive buffers the retrieved user data until it can be properly reassembled. In modern HDD systems, there is sufficient memory to be able to read in and simultaneously store several tracks of data in high-speed memory (SRAM or DRAM). This memory can be used to reorder or simply store the data. In some cases, an HD drive may read a whole track even though only one sector was requested. Some HD drives will hold the extra data as prefetched sectors with the hope that they might subsequently be requested. In addition, in some implementations of the present disclosure, consecutive reads can be decoded out of order.

According to the HDD read-session processing of the present disclosure, for the exemplary HD drive of FIG. 4 that takes three partial overhead sections 210 to attain sufficient timing lock, the average latency is about 5/24 of an HD revolution, for the segmentation scheme of HD track 200 having 12 user sections interleaved with 12 intervening overhead sections. The average will actually be less than that, because a certain percentage of HDD read sessions will begin with the HDD read head positioned somewhere between overhead section 210(11) and user section 220(12), in which cases, the HDD read session will always be able to begin after the HDD read head reaches the full overhead section 210(1). For typical hard disks having more than 12 user sections interleaved with intervening overhead sections, this average latency will be correspondingly smaller.

Furthermore, the time that it takes to complete a full-track HDD read session will approach 1 revolution as the number of user sections and intervening overhead sections becomes larger, which is about the same as for a conventional HDD reading traditional HD track 100 of FIG. 1. The only increase over the conventional HDD read session will be due to the extra number of partial overhead sections that it takes for the HD drive to attain sufficient timing lock.

Thus, an HD drive of the present disclosure can achieve the increased data storage of HD drives of the '246 application while approaching the low latencies and small times-to-complete of traditional HD drives.

Figure 5:
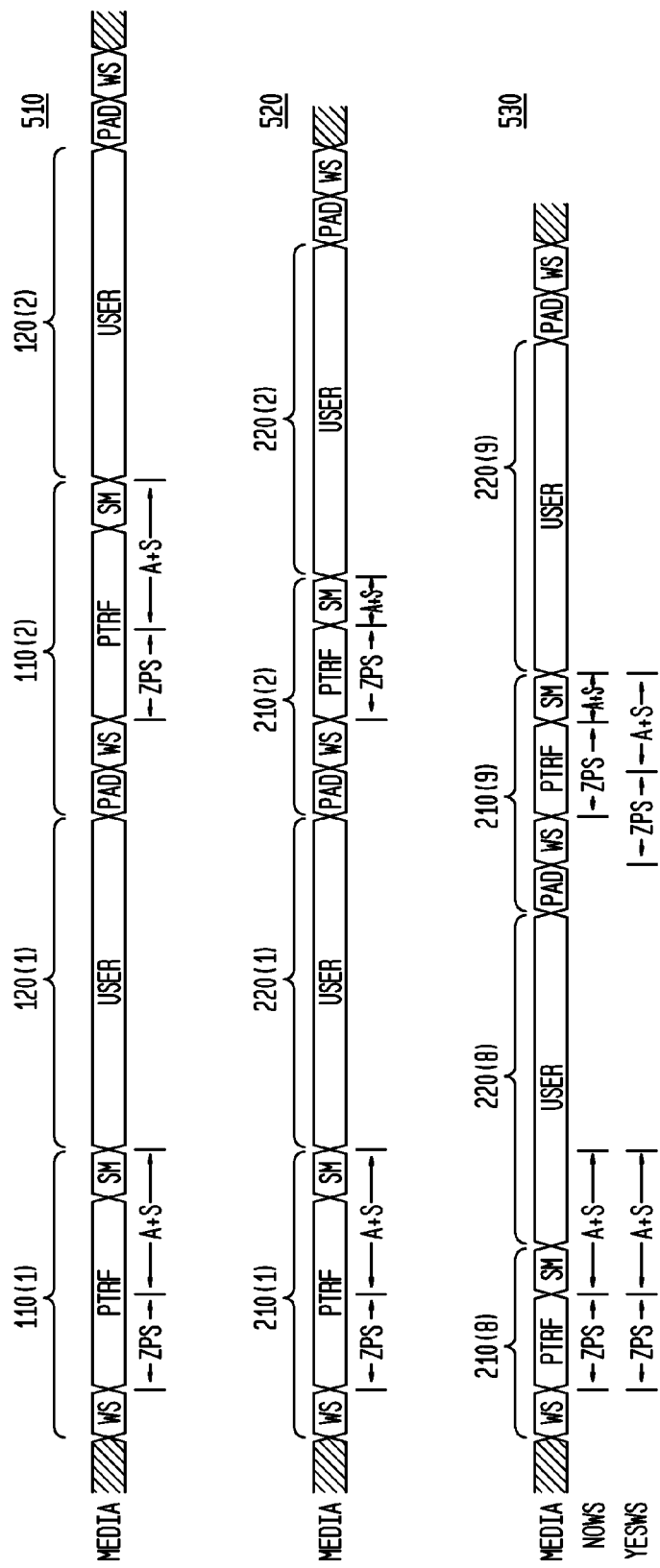
FIG. 5 shows representations of three portions of HD tracks.

FIG. 5 shows representations of three portions 510, 520, and 530 of HD tracks, where:

HD track portion 510 corresponds to overhead sections 110(1) and 110(2) and user sections 120(1) and 120(2) of traditional HD track 100 of FIGS. 1 and 2, where the data stored in those four sections might or might not be coherent;

HD track portion 520 corresponds to full overhead section 210(1) and partial overhead section 210(2) and user sections 220(1) and 220(2) of HD track 200 of FIG. 2, where the data stored in those four sections is coherent; and HD track portion 530 corresponds to overhead sections 210(8) and 210(9) and user sections 220(8) and 220(9) of HD track 200 of FIG. 2, where the data stored in those four sections is coherent.

FIG. 5 is presented to illustrate the differences between the read operations performed by a traditional HD drive for HD track portion 510, the read operations performed by an HD drive according to the '246 application for HD track portion 520, and the read operations performed by an HD drive of the present disclosure for HD track portion 530.

As described previously, for a traditional HD drive, the preamble field PTRF of every overhead section is long enough for the HD drive to attain sufficient timing lock to read the user data in the immediately following user section. Thus, in FIG. 5, the preamble field PTRF in overhead section 110(1) of HD track portion 510 is long enough for a traditional HD drive to attain sufficient timing lock to read the user data in user section 120(1), and the preamble field PTRF in overhead section 110(2) is also long enough for the traditional HD drive to attain sufficient timing lock to read the user data in user section 120(2) independent of whether or not the HD drive just finished reading the user data in user section 120(1).

For an HD drive of the '246 application, the complete preamble field PTRF of the full overhead section 210(1) of HD track portion 520 is long enough for the HD drive to attain sufficient timing lock to read the user data in the immediately following user section 220(1). Because the HD drive knows that the data stored in the four sections of HD track portion 520 are coherent, the HD drive performs read operations that enable it to maintain or re-attain sufficient timing lock using the reduced overhead field PTRF of the partial overhead section 210(2) to be able to read the user data stored in user section 220(2).

In particular, after attaining sufficient timing lock using full overhead section 210(1), the HD drive retains the clock adjustments made during the read operations of overhead section 210(1) and user section 220(1) and applies those retained clock adjustments to begin the read operations for overhead section 210(2). Because the data in partial overhead section 210(2) is coherent with the data in sections 210(1) and 220(1), and because the retained clock adjustments are applied, the zero phase start (ZPS) processing (during which a coarse measure of the phase offset between the HD drive clock and the stored data is generated) performed by the HD drive on the reduced preamble field PTRF of partial overhead section 210(2) will result in a relatively accurate coarse measurement of the phase offset. As a result, the duration of the subsequent acquisition (A) processing (during which a fine measurement of the phase offset is generated) and the slew (S) processing (during which the HD drive clock is adjusted based on the generated fine phase-offset measurement) will be shorter than the A and S processing performed for full overhead section 210(1) and sufficiently short to be satisfactorily completed in time to enable the HD drive to read the user data in user section 220(2).

As described previously, for an HD drive of the present disclosure, the HD drive does not necessarily have to wait until it processes the full overhead section 210(1) before it can begin to read user data. Instead, the HD drive can begin read operations using the next available (e.g., partial) overhead section and attain sufficient timing lock using two or more consecutive partial overhead sections, such as sections 210(8) and 210(9) of HD track portion 530, to read user data, such as that stored in user section 220(9), before reaching full overhead section 210(1).

In particular, during read operations for partial overhead section 210(8), the HD drive does not attain sufficient timing lock by the end of overhead section 210(8) to be able to read the user data in user section 220(8). However, because the HD drive knows that the data stored in the four sections of HD track portion 530 are coherent, the HD drive will (i) continue to attempt to attain sufficient timing lock during user section 220(8), (ii) retain the clock-adjustment data generated during those unsuccessful read operations of overhead section 210(1) and user section 220(1), and (iii) use that retained clock-adjustment data for the read operations for overhead section 210(9).

It is also possible to improve an insufficient timing lock at the end of overhead section 210(8) using the following user section 220(8) using any standard bit-error-rate, mean-square-error, or sync-mark-detection circuits. A comparison of the metric computed versus a threshold will determine whether to retain the clock adjustments available at the end of overhead section 210(8) or at the point where the metric is computed, whichever is deemed better. This refinement is optional, and, if not used, the clock adjustment at the end of overhead section 210(8) is retained.

Because the data in overhead section 210(9) is coherent with the data in sections 210(8) and 220(8), and because the retained clock-adjustment data is applied, the ZPS processing performed by the HD drive on the reduced preamble field PTRF of partial overhead section 210(9) will result in a relatively accurate coarse phase-offset measurement. As a result, the duration of the acquisition and slew (A and S) processing may be sufficiently short to be satisfactorily completed in time to enable the HD drive to read the user data in user section 220(9).

Note that FIG. 5 shows two different modes of read operations for overhead section 210(9): a first mode in which the ZPS processing starts at the beginning of the preamble field PTRF and a second mode in which the ZPS processing starts at the beginning of the WS field. The second mode, which relies on the data stored in the WS field being a pre-pended, coherent portion of the preamble pattern in the PRTF field, enables more time for the A and S processing and therefore increases the chances that sufficient timing lock will be attained in time to read the user data in user section 220(9).

Once sufficient timing lock has been attained during partial overhead section 210(9) and successfully used to read the user data in user section 220(9), sufficient timing lock can be maintained or re-attained during subsequent partial overhead sections 210(10) et seq. to be able to read the user data in subsequent user sections 220(10) et seq., assuming that they also have data that is coherent with the data in the four sections in HD track portion 530.

To summarize, a traditional HD drive does not know or care whether the data stored in its user sections are coherent. Instead, the traditional HD drive treats each overhead section as if it were the first overhead section of a read session. On the other hand, after attaining sufficient timing lock using a full overhead section, an HD drive of the '246 application can read coherent data stored in subsequent user sections separated by partial overhead sections by retaining the clock adjustments from the previous overhead section (starting with the full overhead section and continuing with each subsequent partial overhead section).

An HD drive of the present disclosure does not have to wait until it processes a full overhead section. Instead, when the relevant stored data is coherent, the HD drive tries to attain sufficient timing lock at the next encountered overhead section, whether it is full or partial, retains clock-adjustment data even when it fails to attain sufficient timing lock, and uses that retained data in processing the next partial overhead section, thereby improving the chances that sufficient timing lock will be attained during that partial overhead section or a subsequent partial overhead section, but before a full overhead section is processed.

A conventional HD drive "knows" the locations of the preamble fields and initiates read operations while the read head is positioned over these portions of the overhead field. The HD drives of the present disclosure are not required to have any knowledge beyond that of a conventional HD drive. In other words, only the locations of the preamble fields need be known to use the new function. Once the read head arrives on track, locking reads are initiated either until enough have been processed to attain sufficient timing lock or, if the requested sector arrives under the head, then the read head attempts to read whether or not sufficient timing lock has been attained. In the best case, the user data is successfully read; in the worst case, the user data will not be read until the next rotation of the hard disk. As such, there is no penalty for trying a normal read even where insufficient timing lock is attained. The number of partial overhead fields needed to attain sufficient timing lock can be calculated or determined empirically.

Although the disclosure has been described in the context of an HD track having, in addition to N user sections, N overhead sections, where one is a full overhead section and the remaining N−1 are partial overhead sections, in general, HD tracks of the disclosure have one or more full overhead sections, where at least one full overhead section is followed by a plurality of user sections and intervening partial overhead sections. For example, in one possible embodiment, an HD track can have four full overhead sections located 90 degrees apart from one another with multiple user sections and intervening partial overhead sections located in between each consecutive pair of full overhead sections. Such a segmentation scheme enables the HD track to store one, two, three, or four different coherent sets of user data by writing into different combinations of those four quadrants.

Although the disclosure has been described in the context of an HD drive that can acquire sufficient timing lock using three consecutive partial overhead sections, other HD drives of the disclosure can acquire sufficient timing lock using only two consecutive partial overhead sections, while other HD drives of the disclosure require more than three consecutive partial overhead sections to attain sufficient timing lock. These different HD drives will have correspondingly different latencies and different times-to-complete.

Although the disclosure has been described in the context of HD tracks having partial overhead sections having reduced preamble fields, in alternative embodiments, the partial overhead sections might have no distinct preamble fields. Instead, in such embodiments, the rest of the overhead data in the partial overhead sections as well as the user data in the intervening user sections enable an HD drive to attain sufficient timing lock without needing the complete preamble field of a full overhead section.

In general, during a coherent write session, the preamp is not turned off and back on. Instead, the preamp is kept on, and the WS field is written with the same pattern as the preamble field, that is, all phase coherent. So, for a coherent write, it appears as though there is no splice, and the space for the WS field effectively lengthens the preamble field.

If there is servo data within the WS field, then the WS field will contain the normal preamp closure, the servo data, the preamp open field, and the reduced preamble field. In some cases, it is possible to write across the servo data without destroying the pattern and, in those cases, the preamp should be left on, the servo data should be skipped, and writing should start with the phase-coherent preamble pattern when the servo data is exited, thereby effectively producing a longer preamble pattern. For those cases in which the WS field is completely unrelated to the read machine, it is acceptable to have a big WS field for servo data, since the WS field will be skipped during both normal read and write operations and therefore will not affect phase alignment of the data on both sides of the WS field.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A hard-disk drive for reading user data from a track of a hard disk, the track comprising a full overhead section followed by a plurality of user sections interleaved with a plurality of intervening partial overhead sections, wherein:
   the full overhead section is long enough to enable the drive to attain sufficient timing lock based on only the full overhead section to accurately read user data stored in the immediately following user section;

each partial overhead section is too short to enable the drive to attain the sufficient timing lock based on only one partial overhead section to accurately read the user data stored in the immediately following user section; and the partial overhead sections are long enough to enable the drive to attain the sufficient timing lock based on a set of two or more consecutive partial overhead sections to accurately read the user data stored in the user section immediately following the last partial overhead section in the set.

2. The drive of claim 1, wherein the full overhead section comprises a complete preamble field.

3. The drive of claim 2, wherein each partial overhead section in the set comprises a reduced preamble field that is shorter than the complete preamble field.

4. The drive of claim 2, wherein at least one partial overhead section in the set comprises no preamble field.

5. The drive of claim 2, wherein each overhead section comprises a pad field, a write splice field, and a sync mark field.

6. The drive of claim 1, wherein the track comprises two or more full overhead sections, wherein each consecutive pair of full overhead sections is separated by a plurality of user sections interleaved with a plurality of intervening partial overhead sections.

7. The drive of claim 1, wherein, for the set of two or more consecutive partial overhead sections, the drive is configured to:
(a) begin, but not finish, attaining the sufficient timing lock using a first partial overhead section in the set; and
(b) finish attaining the sufficient timing lock using a last partial overhead section in the set.

8. The drive of claim 7, wherein:
the set comprises the first partial overhead section, the last partial overhead section, and one or more intermediate partial overhead sections; and
the drive is configured to continue, but not finish, attaining the sufficient timing lock using the one or more intermediate partial overhead sections.

9. The drive of claim 7, wherein the drive is configured to continue, but not finish, attaining the sufficient timing lock using the one or more user sections located between the first and last partial overhead sections.

10. The drive of claim 1, wherein coherent data is stored in (i) the two or more consecutive partial overhead sections in the set and (ii) the user sections immediately following each of the two or more consecutive partial overhead sections in the set.

11. The drive of claim 1, wherein the partial overhead sections are long enough to enable the drive to maintain or re-attain the sufficient timing lock based on each of one or more partial overhead sections that follow the set.

12. The drive of claim 11, wherein coherent data is stored in (a) the two or more consecutive partial overhead sections in the set and the one or more partial overhead sections that follow the set and (b) the user sections immediately following (i) each of the two or more consecutive partial overhead sections in the set and (ii) each of the one or more partial overhead sections that follow the set.

13. The drive of claim 1, wherein the drive is configured to write coherent data into (i) the two or more consecutive partial overhead sections in the set and (ii) the user sections immediately following each of the two or more consecutive partial overhead sections in the set.

14. The drive of claim 1, wherein the drive is configured to write coherent data into (a) the two or more consecutive partial overhead sections in the set and one or more partial overhead sections that follow the set and (b) the user sections immediately following (i) each of the two or more consecutive partial overhead sections in the set and (ii) each of one or more partial overhead sections that follow the set.

15. A method for reading the user data from the user section immediately following the last partial overhead section in the set of two or more consecutive partial overhead sections of the track of claim 1, the method comprising:
(a) the drive beginning, but not finishing, attaining the sufficient timing lock using a first partial overhead section in the set;
(b) the drive finishing attaining the sufficient timing lock using a last partial overhead section in the set; and
(c) the drive reading the user data from the user section immediately following the last partial overhead section in the set.

16. The method of claim 15, wherein:
the set comprises the first partial overhead section, the last partial overhead section, and one or more intermediate partial overhead sections; and
step (a) further comprises the drive continuing, but not finishing, attaining the sufficient timing lock using the one or more intermediate partial overhead sections.

17. The method of claim 15, wherein step (a) further comprises the drive continuing, but not finishing, attaining the sufficient timing lock using the one or more user sections located between the first and last partial overhead sections.

18. The method of claim 15, further comprising:
(d) the drive maintaining or re-attaining the sufficient timing lock based on each of one or more partial overhead sections that follow the set; and
(e) the drive reading the user data from each user section immediately following each of the one or more partial overhead sections that follow the set.

19. The drive of claim 18, wherein coherent data is stored in (a) the two or more consecutive partial overhead sections in the set and the one or more partial overhead sections that follow the set and (b) the user sections immediately following (i) each of the two or more consecutive partial overhead sections in the set and (ii) each of the one or more partial overhead sections that follow the set.

20. The method of claim 15, wherein coherent data is stored in (i) the two or more consecutive partial overhead sections in the set and (ii) the user sections immediately following each of the two or more consecutive partial overhead sections in the set.

* * * * *